Nov. 25, 1930.  E. REIPERT  1,782,860
APPARATUS FOR MAKING EXPOSURES OF THE PATH
OR ROUTE OF FLYING MACHINES OR THE LIKE
Filed Feb. 16, 1928  2 Sheets-Sheet 1
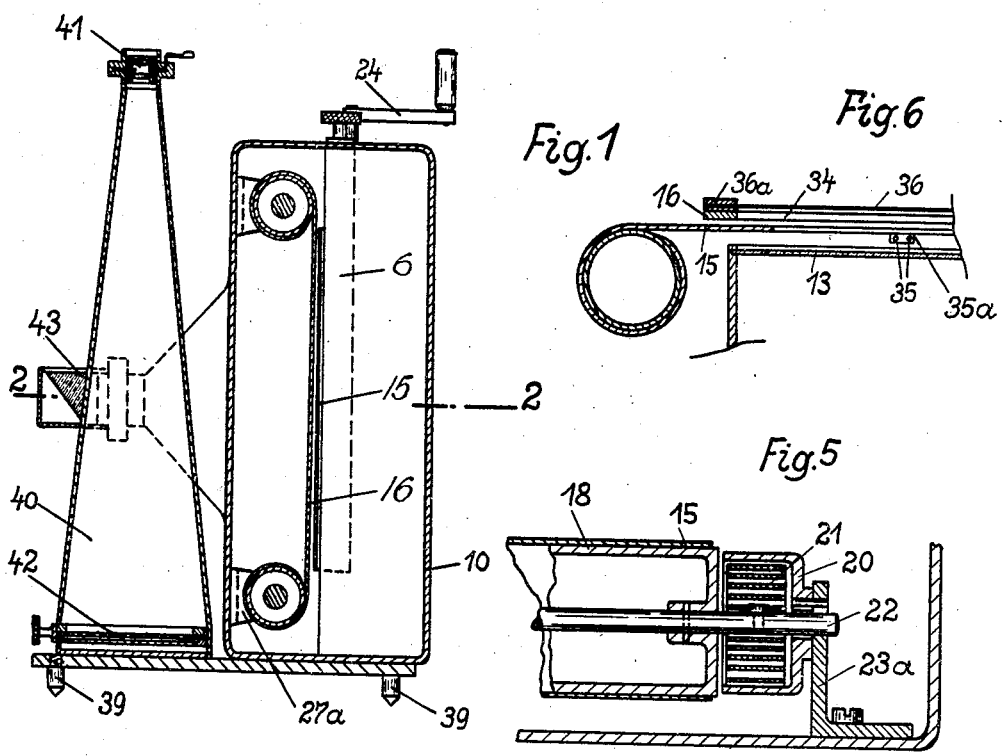
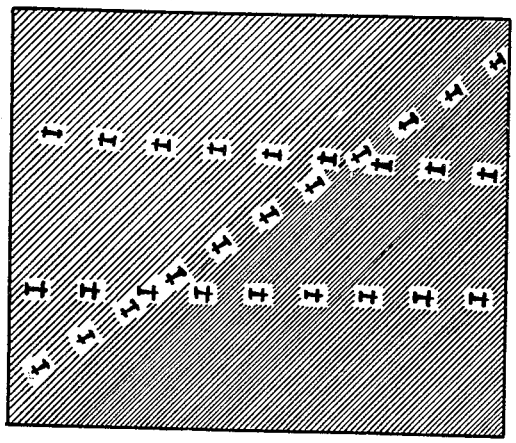
Inventor
Ernst Reipert
by Emil Bönnecke
attorney Nov. 25, 1930.					E. REIPERT					1,782,860
APPARATUS FOR MAKING EXPOSURES OF THE PATH
OR ROUTE OF FLYING MACHINES OR THE LIKE
Filed Feb. 16, 1928			2 Sheets-Sheet 2
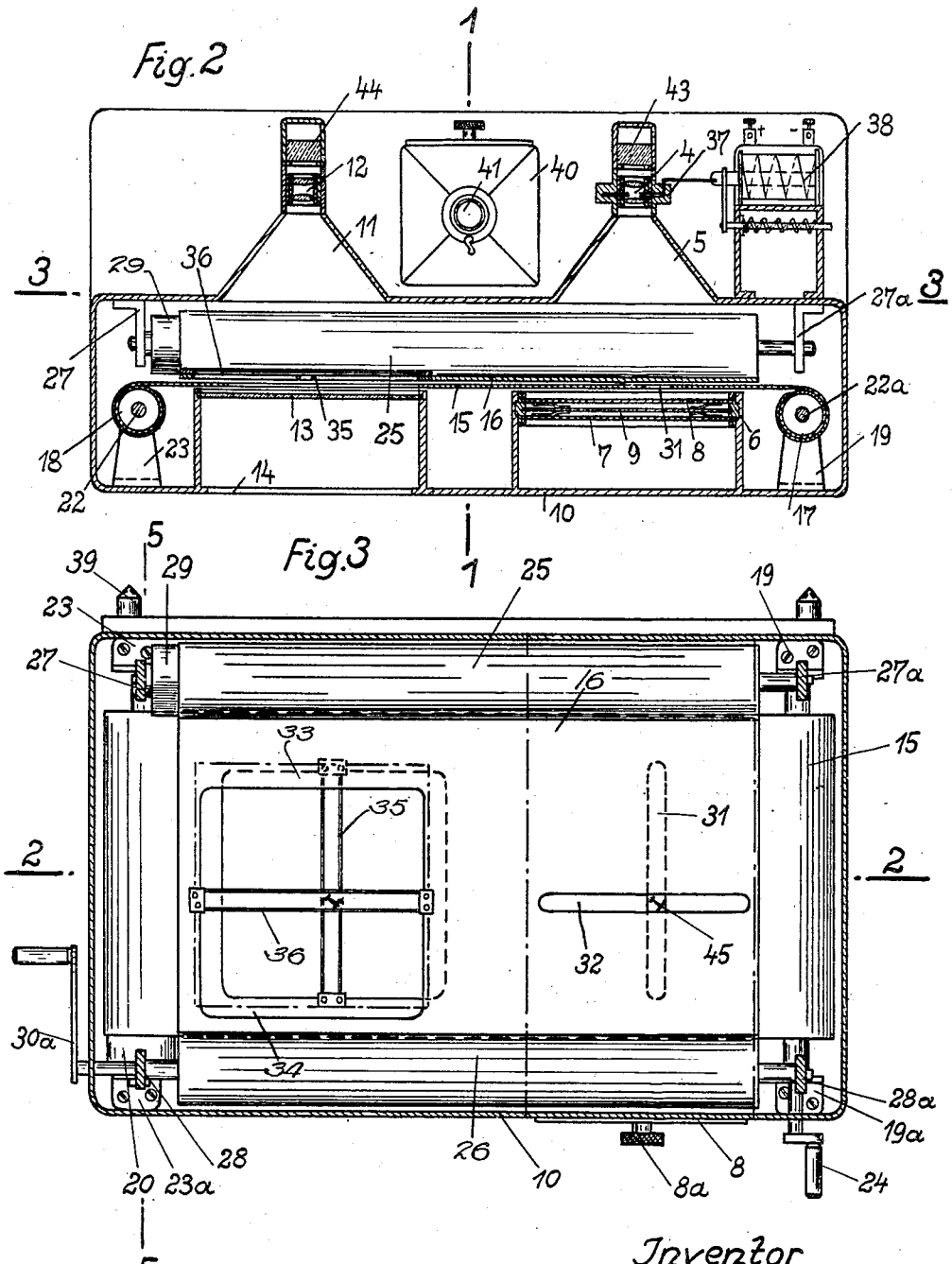
Inventor
Ernst Reipert
by Emil Brunelycke
attorney Patented Nov. 25, 1930

1,782,860

UNITED STATES PATENT OFFICE

ERNST REIPERT, OF NOWAWES, NEAR POTSDAM, GERMANY, ASSIGNOR TO ASKANIA-WERKE AKTIENGESELLSCHAFT VORMALS CENTRALVERKSTATT DESSAU UND CARL BAMBERG-FRIEDENAU, OF BERLIN-FRIEDENAU, GERMANY

APPARATUS FOR MAKING EXPOSURES OF THE PATH OR ROUTE OF FLYING MACHINES OR THE LIKE

Application filed February 16, 1928, Serial No. 254,830, and in Germany September 15, 1926.

The photographic ascertainment of the movement of flying machines and the like has been effected up to now in general with the aid of theodolites or similar instruments, the course of the flights being then ascertained from the exposures made of the readings on the graduated circle of the instrument.

The present invention relates to an apparatus by which it is rendered possible to make a plurality of exposures on one and the same fixed plate while the machine is flying, whereby direct exposures of the horizontal projection of the path of the flight are attained and, besides, also the height in which the machine is flying can be ascertained by means of the exposures made. I make use, for the purpose in view, of a photographic camera provided in known manner with a searcher, and I provide, according to this invention, a movable cut-out in the diaphragm, as well as a travelling mark, with the aid of which said cut-out is positively moved in front of the plate by observing and following the moving object in said searcher, there being attained in this way upon that one plate a plurality of exposures corresponding to the position of the respective object at the time being.

The invention relates also to the arrangement of a separate camera with another focal distance in order to obtain a larger image of the flying machine from which the height in which the flight takes place can be computed; furthermore, means are provided permitting to observe the machine, when it is flying, but also when it is ascending from the earth and when it is descending onto the same.

The invention is illustrated diagrammatically and by way of example on the accompanying drawing on which Figure 1 is a vertical section through the apparatus on line 1—1 of Fig. 2;

Fig. 2 a transverse section on line 2—2 of Figs. 1 and 3, some parts being shown, however, in side view;

Fig. 3 is a section on line 3—3 of Fig. 2, seen from above;

Fig. 4 is a representation of an image obtained with said apparatus, this figure being drawn to an enlarged scale;

Fig. 5 is a section through a part of Fig. 3 on line 5—5; and

Fig. 6 is a sectional view of a part of Fig. 3 on a larger scale.

On the drawing, 4 denotes the objective of a photographic camera 5 closed at its back by a plate-holder 7 consisting of a frame 6 and a lid 8. Within this case is the photographic plate 9. At the side of the camera 5 and in the frame 10 of the apparatus is arranged another camera provided with an objective 12 designed exactly like the objective 4, especially as regards the focal distance, and throwing the image upon the ground glass plate 13. Behind this plate an aperture 14 is provided in the bottom of the box 10 so that it is possible to observe through said aperture the ground glass plate from the rear of the apparatus. The ground glass plate 13 and the plate holders are covered by a common diaphragm consisting of two bands 15 and 16. The ends of the band 15 are affixed to two rollers 17 and 18 and the band is partly wound upon these rollers whereby it is rendered possible to move the band along the plate 13 and the plate holder 7 in the one or the other direction by turning said rollers in the one or the other direction. The roller 17 is supported in two bearings 19 and 19$^a$ affixed to the frame 10. Its axle extends on one side through the casing 10 and is here provided with a hand-crank 24 by means of which the roller can be turned in order to wind the band upon it. The other roller 18 (Figs. 2 and 3) is supported in bearings 23, 23$^a$. At the side of the bearing 23$^a$ is provided a spring casing 20 (Fig. 5) enclosing a helical spring 21, one end of which is secured to the casing, whereas the other end, viz. the inner end, is secured to the trunnion 22 of the roller 18, which trunnion extends through the said casing and said spring.

The spring tends constantly to turn the roller 18 in a certain direction and to wind the diaphragm band 15 thereby upon this roller. In a similar manner the front band 16 is wound upon two rollers 25 and 26, of which the first is supported in bearings 27 and 27ª, affixed to the frame in the box 10, whereas the roll 26 is supported in correspondingly arranged bearings 28 and 28ª. Upon one or both sides of the roller 25 is provided a spring casing 29 enclosing a spring 30 connected at its one end with the casing which is firmly secured to the box 10 and at its other end with the trunnion of the roller 25 so that said spring constantly tends to wind the band 16 upon the roller 25. The roller 26 is provided with a crank 30ª projecting outwardly from the box 10 and serving for turning the roll 26. The rear band 15 is provided with a slot 31 extending parallel to the rollers 17 and 18 bearing said band, and the front band 16 is provided with a slot 32 extending parallel to the rollers 25 and 26 bearing this band. The position of said two slots is such that they are moved to and fro when the two bands are moved to and fro over the plate holders, and that they register with each other in such a manner that both slots together liberate a small part of the plate 9 when the cover 8 of the plate holder is removed. The two bands 15 and 16 are also provided with superposed recesses 33 and 34, the size of which corresponds about to the size of the plate. These recesses are crossed at the rear band 15 by two threads or wires 35 fixed on the band 15 at opposite edges of the recess 33 by means of blocks 35ª and extending parallel to the slot 31 so that between said threads or wires a space exists which corresponds to the width of the slot 31 and is remote from this slot exactly so much as the centres of the two objectives 4 and 12 are remote from one another. The slot 34 of the front band 16 is crossed by two threads or wires 36 fixed on the band 16 at opposite edges of the recess 34 by means of blocks 36ª and extending in the same direction with respect to the boundary lines of the slot 32, and there is thus at that place where the threads or wires 35 and 36 cross each other a space enclosed which is enclosed also on the ground glass disk 13 at an exactly corresponding place, and is liberated at the plate at the time being by the slots 31 and 32. The objective 4 is provided with a closure or shutter 37 opened and closed periodically by a suitably designed clock 38 in certain definite intervals of time, for instance ½ second or 1 second.

The apparatus which has feet 39 is placed with these feet upon a table or any other suitable base.

There is arranged between the two objectives 4 and 12 another camera 40 in the box 10, provided with an objective 41 and a plate case 42. The axis of this camera extends at right angles with respect to the axes of the cameras 5 and 11. The focal distance of the objective 41 is considerably longer than the focal distance of the objectives 4 and 12 so that the image thrown upon the plate present in the plate holder 42 is considerably larger than the picture thrown upon the plate 9 at the same distance of the object to be photographed. There may be provided, if desired, a prism 43 in front of the objective 4 and a prism 44 in front of the objective 12. As long as the prisms are not arranged in front of the objectives, these latter take up only images incoming laterally, but when the prisms are arranged as stated, objects present above the apparatus are photographed, the vertically upwardly directed rays being deflected by the prisms in horizontal direction to the plate 9 and the ground glass plate 13.

The manner of operation of the apparatus is as follows: When the plate 9 has been liberated by the withdrawing of the lid 8 of the plate holder by means of the grip 8ª, the plate is covered so much by the two bands 15 and 16, which together form a diaphragm, that only that portion of the plate can be exposed on which the slots 31 and 32 cross each other. As the apparatus is intended for observing flying machines, viz., of objects, whose distance from the apparatus is approximately very large in proportion to the distance of the two cameras 5 and 11 from each other, there will appear upon the ground glass plate and above the plate always the same images. When, therefore, the operator looks through the aperture 14, he sees upon the ground disk the sky, viz., the back-ground of the flying machine, and sees also how this machine moves along in front of the sky. The observer must now turn the hand cranks 24 and 30 in such directions that the flying machine is always visible on that portion of the ground plate which is bounded by the threads or wires 35 and 36 where they are crossing each other, as in Fig. 3, where 45 denotes the flying machine. If this machine is visable at the place shown in Fig. 3, then a corresponding image is thrown upon the just free portion of the ground plate. The observer must, therefore, follow the flying machine with the bands 15 and 16, and as the objective is liberated periodically in definite intervals of time there will arise upon the plate 9 a series of consecutive images whereby the position of the flying machine (or other object observed and followed or prosecuted) at the points of time concerned will be ascertained. An image of such a kind is shown in Fig. 4.

From the distance between two consecutive images can be computed the speed the flying machine has had at the respective time, in that this latter is known; and the known focal distance of the objective and the known size of the flying machine permit to ascertain the height in which the machine has been flying at that time by measuring the size of the image. As, however, the image is proportionally small, an exposure of the flying machine is made at a suitable time, while observing the machine, with the aid of the camera 40 which delivers a by far larger image, and the height of the flight can be computed from the size of this larger image, the focal distance of the objective 41, and the known size of the flying machine.

When the flying machine is to be observed while it is ascending or descending, the prisms 43 and 44 are removed prior thereto, but when the machine is on its proper path or route the prisms are again inserted.

I wish to be understood that various departures in the details of the apparatus are possible without a departure from the spirit of the invention. The drawings show merely a constructional form by way of example.

I claim:—

1. An apparatus for making exposures of the path or route of a flying machine or the like, comprising a photographic camera; a searcher camera arranged adjacent to the first-mentioned camera and through which the object is observed; a pair of common diaphragms for the cameras, each having a pair of openings of the diaphragms therein, the openings of each camera overlapping and the openings of the diaphragms of the photographic camera forming a restricted opening; and means for moving said diaphragms to adjust the openings of the diaphragms in the searcher camera to maintain the object to be photographed within the restricted opening of the diaphragms of the photographic camera.

2. An apparatus for making exposures of the path or route of a flying machine or the like, comprising a photographic camera; a searcher camera arranged adjacent to the first-mentioned camera and through which the object is observed; a pair of common diaphragms for the cameras, each having a pair of openings of the diaphragms therein, the openings of each camera overlapping and the openings of the diaphragms of the photographic camera forming a restricted opening; means for moving said diaphragms to adjust the openings of the diaphragms in the searcher camera to maintain the object to be photographed within the restricted opening of the diaphragms of the photographic camera; and a shutter for the photographic camera adapted to be periodically operated to obtain a series of images through the restricted opening of the diaphragms of the photographic camera.

3. An apparatus for making exposures of the path or route of a flying machine or the like, comprising a photographic camera; a searcher camera arranged parallel to the first-mentioned camera and through which the object is observed; a pair of common diaphragms for the cameras, each having a pair of openings of the diaphragms therein, the openings of each camera overlapping and the openings of the diaphragms of the photographic camera forming a restricted opening; guiding members connected across the diaphragm openings of the searcher camera; and means for moving said diaphragms to adjust the guiding members in the searcher camera to maintain the object to be photographed within the restricted opening of the diaphragms of the photographic camera.

4. An apparatus for making exposures of the path or route of a flying machine or the like, comprising a photographic camera; a searcher camera arranged parallel to the first-mentioned camera and through which the object is observed; a pair of common diaphragms for the cameras, each having a pair of openings of the diaphragms therein, the openings of each camera overlapping and the openings of the diaphragms of the photographic camera forming a restricted opening; guiding members connected across the diaphragm openings of the searcher camera; means for moving said diaphragms to adjust the guiding members of the diaphragms in the searcher camera to maintain the object to be photographed within the restricted opening of the diaphragms of the photographic camera; and a shutter of the photographic camera adapted to be periodically operated to obtain a series of images through the restricted opening of the diaphragms of the photographic camera.

5. An apparatus for making exposures of the path or route of a flying machine or the like, comprising a photographic camera; a searcher camera arranged parallel to the photographic camera and through which the object is observed; a pair of common diaphragm bands for the cameras movable at right angles to each other and having a pair of openings therein, the openings of the bands of each camera overlapping and the openings of the bands of the photographic camera forming a restricted opening; and means for moving said bands to adjust the openings of the bands in the searcher camera to maintain the object to be photographed within the restricted opening of the bands of the photographic camera.

6. An apparatus for making exposures of the path or route of a flying machine or the like, comprising a photographic camera; a searcher camera arranged parallel to the photographic camera and through which the object is observed; a pair of common diaphragm bands for the cameras movable at right angles to each other and having a pair of openings therein, the pair of openings of the bands for the photographic camera being in the form of elongated overlapping slots at right angles to each other to form a restricted opening and the openings of the bands for the searcher camera being large overlapping openings of the same size; and means for moving said bands to adjust the openings of the bands in the searcher camera to maintain the object to be photographed within the restricted opening of the bands of the photographic camera.

7. An apparatus for making exposures of the path or route of a flying machine or the like, comprising a photographic camera; a searcher camera arranged parallel to the photographic camera and through which the object is observed; a pair of common diaphragm bands for the cameras movable at right angles to each other and having a pair of openings therein, the pair of openings of the bands for the photographic camera being in the form of elongated overlapping slots at right angles to each other to form a restricted opening and the openings of the bands for the searcher camera being large overlapping openings of the same size; a pair of guiding members connected across each diaphragm opening of the searcher camera; and means for moving said diaphragm bands to adjust the openings of the bands in the searcher camera to maintain the object to be photographed within the restricted opening of the bands of the photographic camera.

8. An apparatus for making exposures of the path or route of a flying machine or the like, comprising a photographic camera; a searcher camera arranged parallel to the photographic camera and through which the object is observed; a pair of common diaphragm bands for the cameras movable at right angles to each other and having a pair of openings therein, the pair of openings of the bands for the photographic camera being in the form of elongated overlapping slots at right angles to each other to form a restricted opening and the openings of the bands for the searcher camera being large overlapping openings of the same size; a pair of guiding members connected across each diaphragm opening of the searcher camera; means for moving said diaphragm bands to adjust the openings of the bands in the searcher camera to maintain the object to be photographed within the restricted opening of the bands of the photographic camera; and a shutter for the photographic camera adapted to be periodically operated to obtain a series of images through the restricted opening of the photographic camera.

In testimony whereof I affix my signature.

ERNST REIPERT.